United States Patent
Yao et al.

(10) Patent No.: US 10,830,906 B2
(45) Date of Patent: Nov. 10, 2020

(54) METHOD OF ADAPTIVE WEIGHTING ADJUSTMENT POSITIONING

(71) Applicant: AUTOMOTIVE RESEARCH & TESTING CENTER, Changhua Hsien (TW)

(72) Inventors: Wun-Sheng Yao, Changhua Hsien (TW); Che-Cheng Chang, Changhua Hsien (TW); Yi Yan, Changhua Hsien (TW)

(73) Assignee: AUTOMOTIVE RESEARCH & TESTING CENTER, Changhua Hsien (TW)

( * ) Notice: Subject to any disclaimer, the term of this patent is extended or adjusted under 35 U.S.C. 154(b) by 295 days.

(21) Appl. No.: 15/857,285

(22) Filed: Dec. 28, 2017

(65) Prior Publication Data
US 2019/0204455 A1    Jul. 4, 2019

(51) Int. Cl.
*G01S 19/47*    (2010.01)
*G01S 19/49*    (2010.01)

(52) U.S. Cl.
CPC .............. *G01S 19/47* (2013.01); *G01S 19/49* (2013.01)

(58) Field of Classification Search
CPC .......... G01S 19/46; G01S 19/47; G01S 19/49; G01S 13/74; G01S 13/86; G01S 13/867; G01S 5/12; G01S 5/14; G01C 21/165

USPC ....................................................... 342/357.3
See application file for complete search history.

(56) References Cited

U.S. PATENT DOCUMENTS

| 9,435,651 B2* | 9/2016 | Morin ..................... G01S 19/49 |
| 2002/0019701 A1* | 2/2002 | Miller ................... G01C 21/165 |
| | | 701/472 |
| 2018/0095476 A1* | 4/2018 | Madsen .................. G01S 19/47 |

* cited by examiner

*Primary Examiner* — Erin F Heard
*Assistant Examiner* — Michael W Justice
(74) *Attorney, Agent, or Firm* — Birch, Stewart, Kolasch & Birch, LLP (57) ABSTRACT

A method of adaptive weighting adjustment positioning has the following steps: performing an initialization procedure, determining whether a first feature point is detected; when the first feature point is detected, based on multiple positioning methods, multiple positioning information will be generated, and multiple weightings will be set, and then based on the weightings and the positioning information, calculating the positioning information output; by way of adaptive weighting adjustment among the multiple positioning methods, the multiple positioning methods can be integrated. In this way, even if one of the positioning methods is temporarily unavailable, the positioning information can still be calculated by weighting adjustment between the positioning information of the remaining two available methods, and that allows users to continue to obtain accurate positioning information to confirm the current location.

16 Claims, 6 Drawing Sheets

METHOD OF ADAPTIVE WEIGHTING ADJUSTMENT POSITIONING

BACKGROUND OF THE INVENTION

1. Field of the Invention

The present invention relates to a positioning method, and in particular, to an adaptive weighting adjustment positioning method.

2. Description of the Prior Arts

When people need to travel to a new place, they often start by looking through the map, finding the destination through the map, and planning the route to go. With the technology advancement, most of the conventional mobile devices are equipped with an electronic map and a positioning system. The positioning system locates the user's current location in the electronic map and provides a planned route from the current location to the destination so that the user can travel to the destination based on the planned route shown on the mobile device. Therefore, the positioning system must continue to function during the movements and to update the planned route to guide the user accurately to the destination.

One of the conventional positioning systems is the Global Positioning System (GPS), which receives signals from satellites and calculates the current position of the user on Earth. In addition, another conventional positioning system is an inertial positioning system, which needs to be used in conjunction with other positioning systems. Generally speaking, it is used with GPS. The inertial positioning system is provided with an inertial measurement unit (IMU) to measure the mobile device's three-axis attitude angle and acceleration. In this way, the mobile device can calculate the moving direction and the speed of itself according to the information generated by the IMU, and can calculate its current position with GPS, so as to further predict the mobile device's location according to the calculated moving direction, speed, and current location of the mobile device.

However, the GPS calculates the current location by receiving the satellite signals, but when the mobile device is in a location where the satellite signals cannot be clearly received, such as inside a building, a basement, or a tunnel, the mobile device cannot clearly receive signals from satellites and will fail to locate its current location.

In addition, the inertial positioning system can predict the position of the mobile device according to the moving direction and speed of the mobile device without the geographical position limitation. However, the signals sensed by the IMU may have errors and are accumulating with time. Thus, the longer a period of time the inertial positioning system is used, the greater an error is accumulated between the actual position and the position indicated by the inertial positioning system.

In short, in the prior art positioning systems, GPS would be limited by geographical location, leading to the disadvantage that it could not be used in some places, and the inertial positioning system has the disadvantage that it would accumulate more errors as usage time increases. Therefore, the related positioning systems of the prior arts need to be further improved.

SUMMARY OF THE INVENTION

In view of the disadvantages that the positioning system of the prior art cannot be used due to geographical position limitation and the increasing cumulative error as the usage time increases, the present invention provides a method of adaptive weighting adjustment positioning which includes the following steps to provide more accurate location information:

performing an initialization procedure;

determining whether a first feature point is detected, wherein the first feature point is a surface feature object and reflects a coordinate position;

when the first feature point is detected, generating a first feature point positioning information, a first GPS positioning information and a first inertial positioning information, setting a weighting of a feature point positioning to be larger than the sum of a weighting of a GPS positioning and a weighting of an inertial positioning; and calculating a positioning information output based on the weighting of the feature point positioning, the first feature point positioning information, the weighting of the GPS positioning, the first GPS positioning information, the weighting of the inertial positioning, and the first inertial positioning information; wherein, the sum of the weighting of the feature point positioning, the weighting of the GPS positioning, and the weighting of the inertial positioning is equal to 1, wherein, the first feature point positioning information, the first GPS positioning information, and the first inertial positioning information each reflect a respective location in a positioning coordinate system;

when the first feature point is not detected, setting the weighting of the feature point positioning to be smaller than the sum of the weighting of the GPS positioning and the weighting of the inertial positioning; and calculating a positioning information output based on the weighting of the feature point positioning, the first feature point positioning information, the weighting of the GPS positioning, the first GPS positioning information, the weighting of the inertial positioning, and the first inertial positioning information.

The method of adaptive weighting adjustment positioning of the present invention, through adaptively adjusting the weighting distribution among the three positioning methods of feature point positioning, GPS positioning and inertial positioning, integrates the positioning information from the three positioning methods of feature point positioning, GPS positioning and inertial positioning. In this way, even if one of the positioning methods is temporarily unavailable, the positioning information can still be calculated by weighting adjustment between the positioning information of the remaining two available methods, and that allows users to continue to obtain accurate positioning information to confirm the current location.

Other objectives, advantages and novel features of the invention will become more apparent from the following detailed description when taken in conjunction with the accompanying drawings.

DETAILED DESCRIPTION OF THE PREFERRED EMBODIMENTS

The following, with the drawings and the preferred embodiments of the present invention, further illustrates the technical means that the present invention adopts to achieve the intended purpose.

Figure 1:
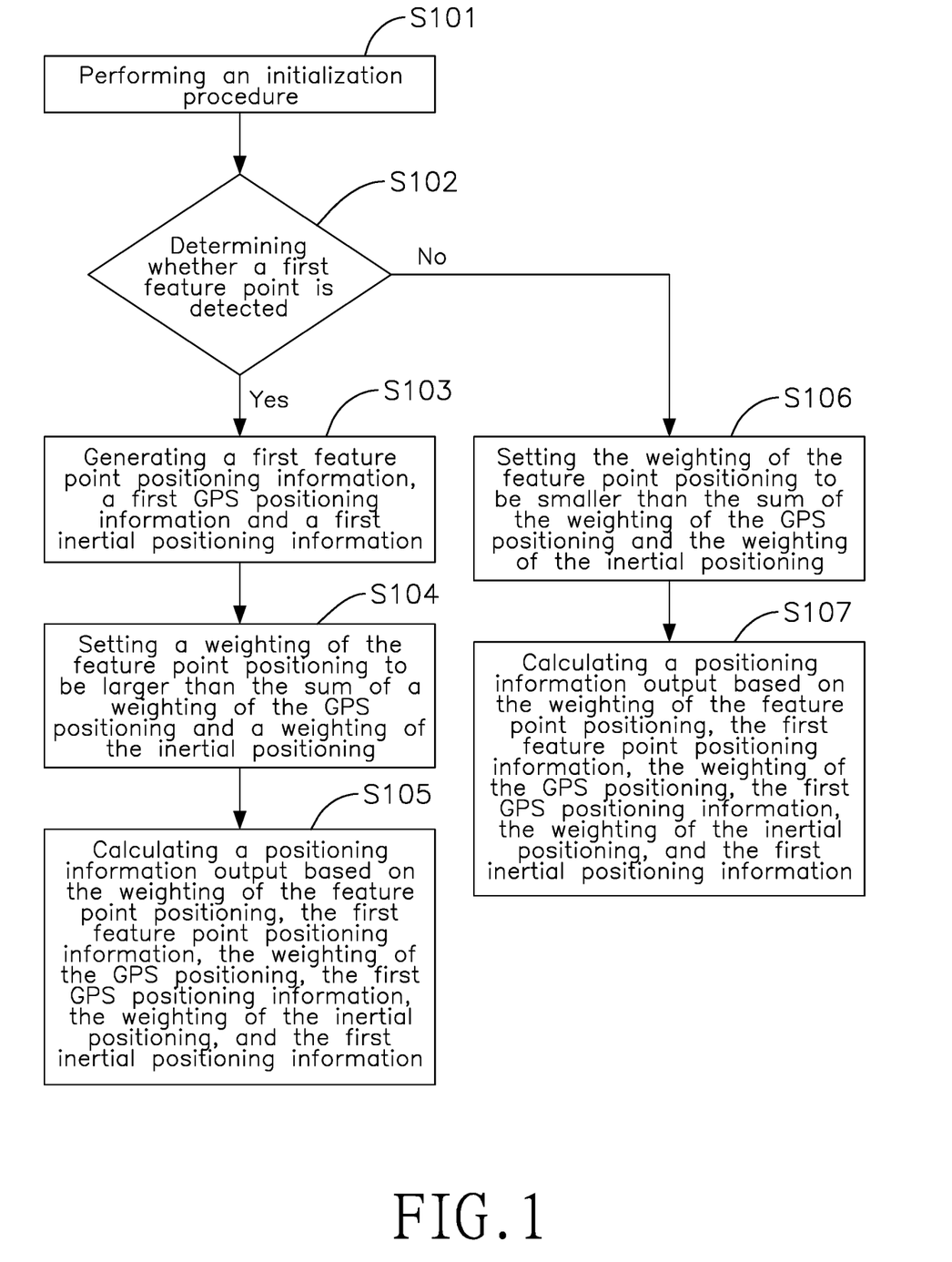
FIG. 1 is a flow chart schematic of the method for the first preferred embodiment of the present invention.

Referring to FIG. 1, a first preferred embodiment of the present invention is a method of adaptive weighting adjustment positioning, including the following steps:

performing an initialization procedure (S101);

determining whether a first feature point is detected, wherein the first feature point is a surface feature object and reflects a coordinate position (S102);

when the first feature point is detected, generating a first feature point positioning information, a first GPS positioning information and a first inertial positioning information (S103), setting a weighting of a feature point positioning to be larger than the sum of a weighting of a GPS positioning and a weighting of an inertial positioning (S104); and calculating a positioning information output based on the weighting of the feature point positioning, the first feature point positioning information, the weighting of the GPS positioning, the first GPS positioning information, the weighting of the inertial positioning, and the first inertial positioning information (S105); wherein, the sum of the weighting of the feature point positioning, the weighting of the GPS positioning, and the weighting of the inertial positioning is equal to 1, wherein, the first feature point positioning information, the first GPS positioning information, and the first inertial positioning information each reflect a respective location in a positioning coordinate system;

when the first feature point is not detected, setting the weighting of the feature point positioning to be smaller than the sum of the weighting of the GPS positioning and the weighting of the inertial positioning (S106); and calculating a positioning information output based on the weighting of the feature point positioning, the first feature point positioning information, the weighting of the GPS positioning, the first GPS positioning information, the weighting of the inertial positioning, and the first inertial positioning information (S107).

In this preferred embodiment, when the first feature point is detected, the weighting of the feature point positioning is set to be 1 and the weighting of the GPS positioning and the weighting of the inertial positioning are set to be 0;

when the first feature point is not detected, the weighting of the feature point positioning is set to be 0 and the sum of the weighting of the GPS positioning and the weighting of the inertial positioning is set to be 1.

Since the method of the feature point positioning is to confirm the current position of the user by recognizing a surface feature object such as a landmark or a sign that are helpful for identifying a location of an area, the method of feature point positioning can accurately locate the current position of the user. The method of adaptive weighting adjustment positioning of the present invention is that when the feature point is detected, the weighting of the feature point is directly adjusted to 1, that is, the positioning information of the feature point is directly used as the positioning information output for the user to confirm the current location.

The method of adaptive weighting adjustment positioning of the present invention, through adaptively adjusting the weighting distribution among the three positioning methods of feature point positioning, GPS positioning and inertial positioning, integrates the positioning information from the three positioning methods of feature point positioning, GPS positioning and inertial positioning. In this way, even if one of the positioning methods is temporarily unavailable, the positioning information can still be calculated by weighting adjustment between the positioning information of the remaining two available methods, and that allows users to continue to obtain accurate positioning information to confirm the current location.

Further, in the preferred embodiment, in the step of detecting the first feature point and then calculating the positioning information output, that is, in step S105, a GPS drift error parameter is further generated based on the positioning information of the first feature point and the first GPS positioning information.

The present invention further uses the coordinate value generated by the first feature point, that is, the first feature point positioning information as the real position of the user, and calculates the GPS drift error parameter by using the simultaneously generated GPS positioning information as the basis of GPS positioning weighting value adjustment.

That is, in the preferred embodiment, only one feature point needs to be detected, and the GPS drift error parameter can be calculated according to the feature point positioning information generated by the feature point as well as the GPS positioning information generated at the same time.

Figure 2:
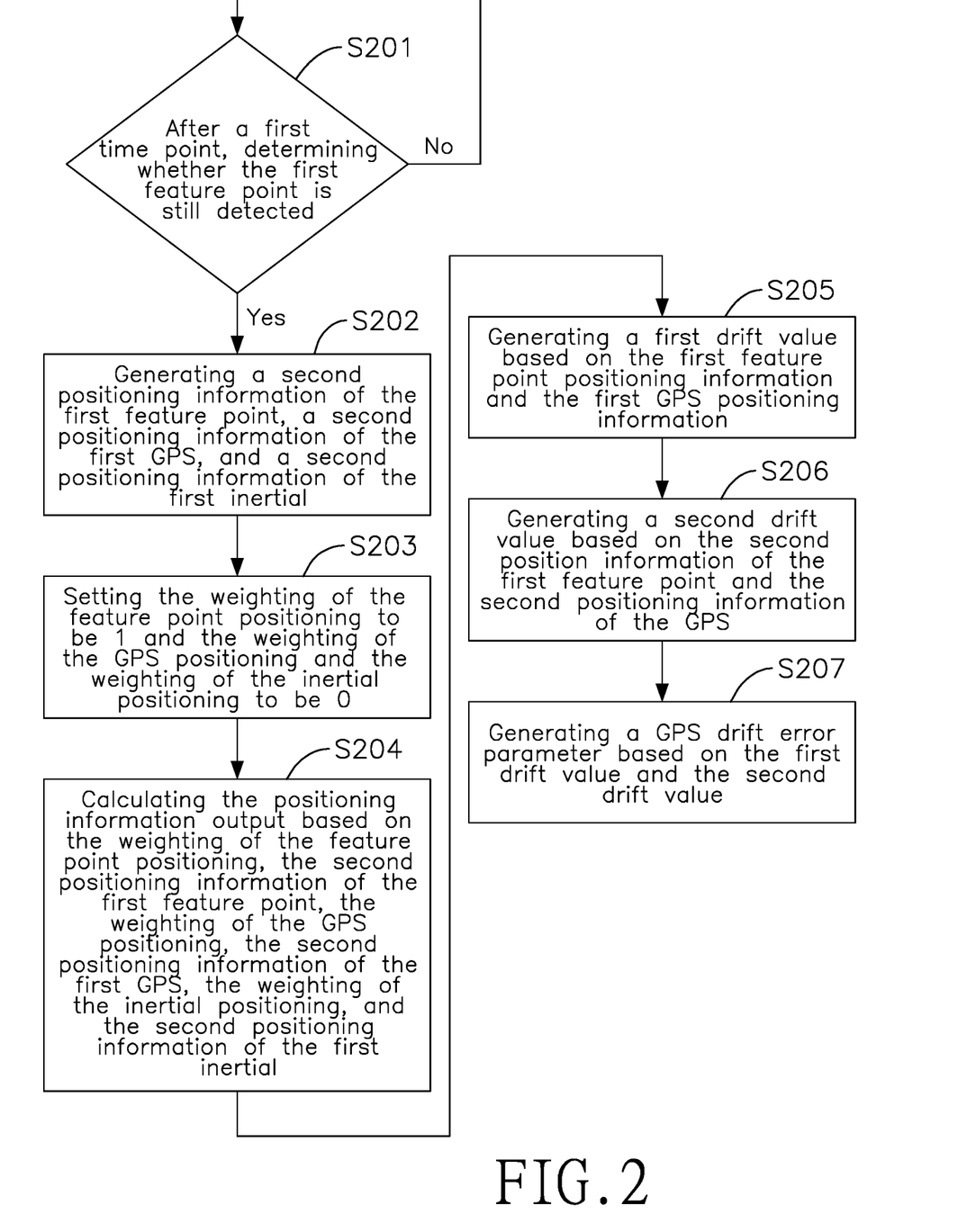
FIG. 2 is a flow chart schematic of the method for the second preferred embodiment of the present invention.

In addition, referring to FIG. 2, a second preferred embodiment of the present invention, after detecting the first feature point and calculating the positioning information output, that is, after step S105, further includes the following steps:

After a first time point, determining whether the first feature point is still detected (S201);

when the first feature point is detected again, generating a second positioning information of the first feature point, a second positioning information of the first GPS, and a second positioning information of the first inertial (S202);

setting the weighting of the feature point positioning to be 1 and the weighting of the GPS positioning and the weighting of the inertial positioning to be 0 (S203);

calculating the positioning information output based on the weighting of the feature point positioning, the second positioning information of the first feature point, the weighting of the GPS positioning, the second positioning information of the first GPS, the weighting of the inertial positioning, and the second positioning information of the first inertial (S204);

generating a first drift value based on the first feature point positioning information and the first GPS positioning information (S205);

generating a second drift value based on the second position information of the first feature point and the second positioning information of the GPS (S206); and generating a GPS drift error parameter based on the first drift value and the second drift value (S207).

The present invention further uses the coordinate value derived from the first feature point, that is, the first feature point positioning information and the second positioning information of the first feature point, as the real position of the user, and utilizes two pieces of consecutive positioning information generated by the same feature point as well as GPS positioning information to calculate the GPS drift error parameter as the basis for GPS positioning weighting adjustment. Therefore, when two consecutive pieces of positioning information generated by the same feature point are captured, the GPS positioning weighting under the current environment can be calculated which contributes to the optimized positioning information after the fusion of sensing methods. In the preferred embodiment, the GPS drift error parameter is calculated based on a look-up table. In short, the GPS drift error parameter is obtained through constant experiments, repeated testing of multiple feature points and generation of the first drift value and the second drift value, respectively, and recording corresponding GPS drift error parameters so as to create a table. Afterwards, according to the generated first drift value and the second drift value, the corresponding GPS drift error parameters can be obtained through table look-up.

Furthermore, in this preferred embodiment, through multiple pieces of feature point positioning information generated by the same feature point and each piece of GPS positioning information generated at the same time when each piece of feature point positioning information is generated, the GPS drift error parameters are calculated. As more positioning information is generated according to the same feature point, the corresponding GPS positioning information will also be more. Therefore, as more information is available for reference, the GPS drift error parameter will be calculated more accurately. In the preferred embodiment, the two feature point positioning information generated according to the same feature point is used as an example, but not limited thereto.

Figure 3:
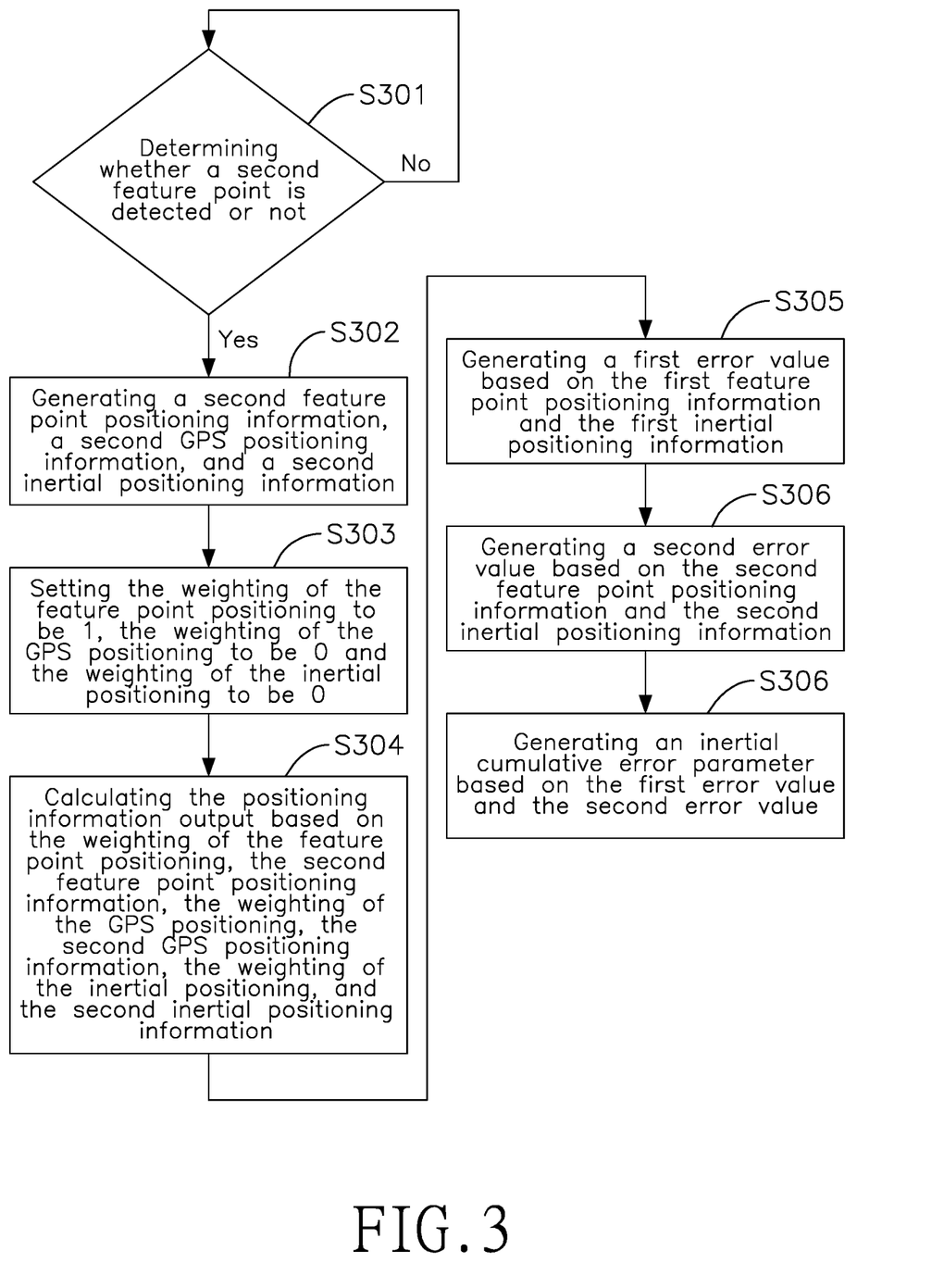
FIG. 3 is a flow chart schematic of the method for the third preferred embodiment of the present invention.

In addition, as shown in FIG. 3, a third preferred embodiment of the present invention, after generating the GPS drift error parameter, that is, after step S207, further includes the following steps:

determining whether a second feature point is detected or not (S301); wherein the first feature point and the second feature point are two consecutively detected feature points;

when the second feature point is detected, generating a second feature point positioning information, a second GPS positioning information, and a second inertial positioning information (S302);

setting the weighting of the feature point positioning to be 1, the weighting of the GPS positioning to be 0 and the weighting of the inertial positioning to be 0 (S303);

calculating the positioning information output based on the weighting of the feature point positioning, the second feature point positioning information, the weighting of the GPS positioning, the second GPS positioning information, the weighting of the inertial positioning, and the second inertial positioning information (S304);

generating a first error value based on the first feature point positioning information and the first inertial positioning information (S305);

generating a second error value based on the second feature point positioning information and the second inertial positioning information (S306); generating an inertial cumulative error parameter based on the first error value and the second error value (S307).

The present invention further uses the coordinate values derived from the first feature point and the second feature point, that is, the first feature point positioning information and the second feature point positioning information, as the real position of the user to eliminate the cumulative error caused by inertial positioning. In addition, the coordinate value derived by the feature point is used as the real position of the user, the inertial cumulative error parameter is calculated by using the feature point positioning information and the inertial positioning information at the moment a different feature point is detected within a certain distance, so as to determine the value of the inertial positioning weighting which contributes to the optimized positioning information after the fusion of sensing methods.

In the preferred embodiment, the inertial cumulative error parameter is calculated based on the look-up table. In short, the inertial cumulative error parameter is obtained through constant experiments, repeated testing of multiple feature points and generation of the first drift value and the second drift value, respectively, and recording corresponding inertial cumulative error parameters so as to create a table. Afterwards, by the generated first drift value and the second drift value, the corresponding inertial cumulative error parameter can be obtained through table look-up.

Figure 4:
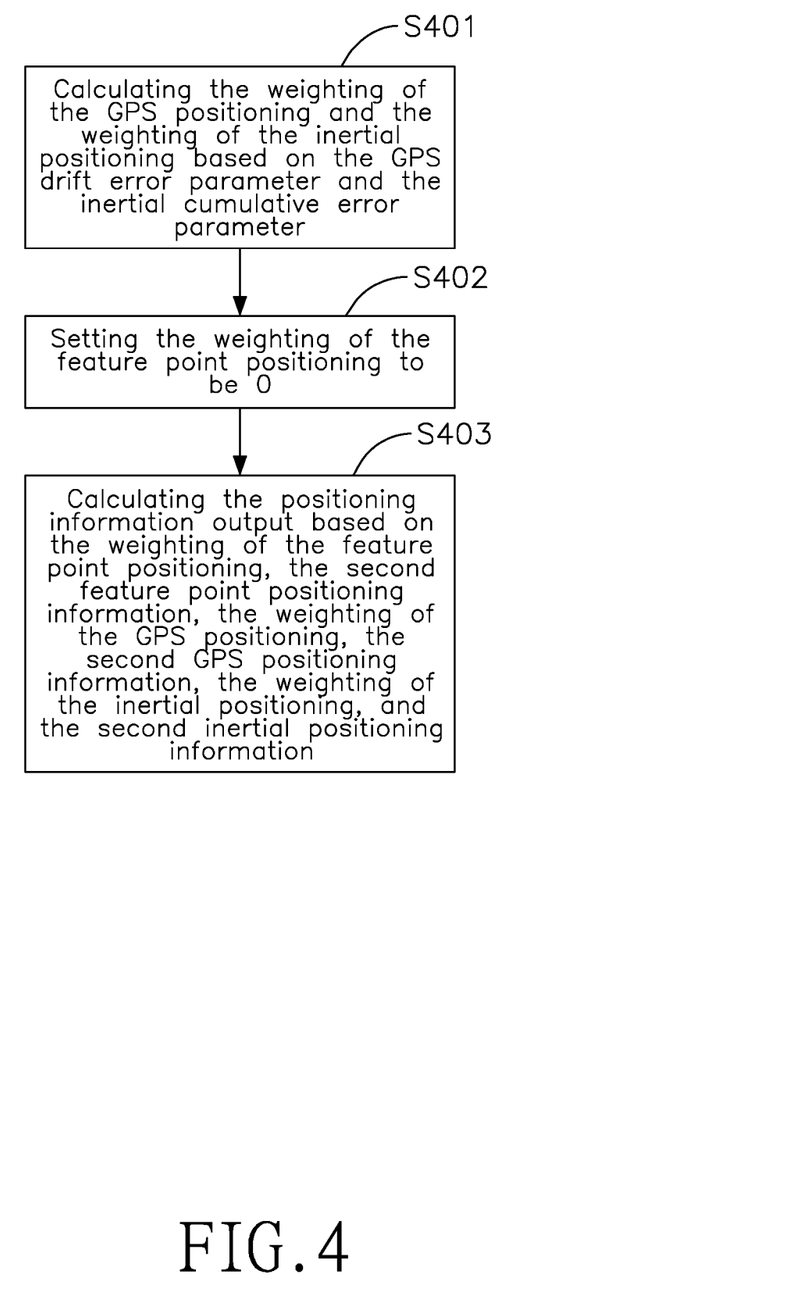
FIG. 4 is a flow chart schematic of the method for the fourth preferred embodiment of the present invention.

Please refer to FIG. 4 again. A fourth preferred embodiment of the present invention, after generating the inertial cumulative error parameter, that is, after step S307, further includes the following steps:

calculating the weighting of the GPS positioning and the weighting of the inertial positioning based on the GPS drift error parameter and the inertial cumulative error parameter (S401);

setting the weighting of the feature point positioning to be 0 (S402); and calculating the positioning information output based on the weighting of the feature point positioning, the second feature point positioning information, the weighting of the GPS positioning, the second GPS positioning information, the weighting of the inertial positioning, and the second inertial positioning information (S403).

In summary, the present invention uses the coordinate value derived from the first feature point, that is, the first feature point positioning information and the second positioning information of the first feature point, to calculate the GPS drift error parameter. In addition, using the coordinate which is derived from the first feature point and the second feature point, that is, the first feature point positioning information and the second feature point positioning information, as the real position of the user, the inertial cumulative error parameter is calculated by using the feature point positioning information and the inertial positioning information at the moment a different feature point is detected within a certain distance. And finally, calculate the GPS positioning weighting and the inertial positioning weighting according to the GPS drift error parameter and the inertial cumulative error parameter. Since the GPS drift error parameter and the inertial cumulative error parameter will change as the user moves, whenever the user moves to a position where the feature point can be detected, the GPS drift error parameter and the inertial cumulative error parameter can be updated. By continuously updating the GPS positioning weighting and the inertial positioning weighting, the positioning information output will be more accurate.

Figure 5:
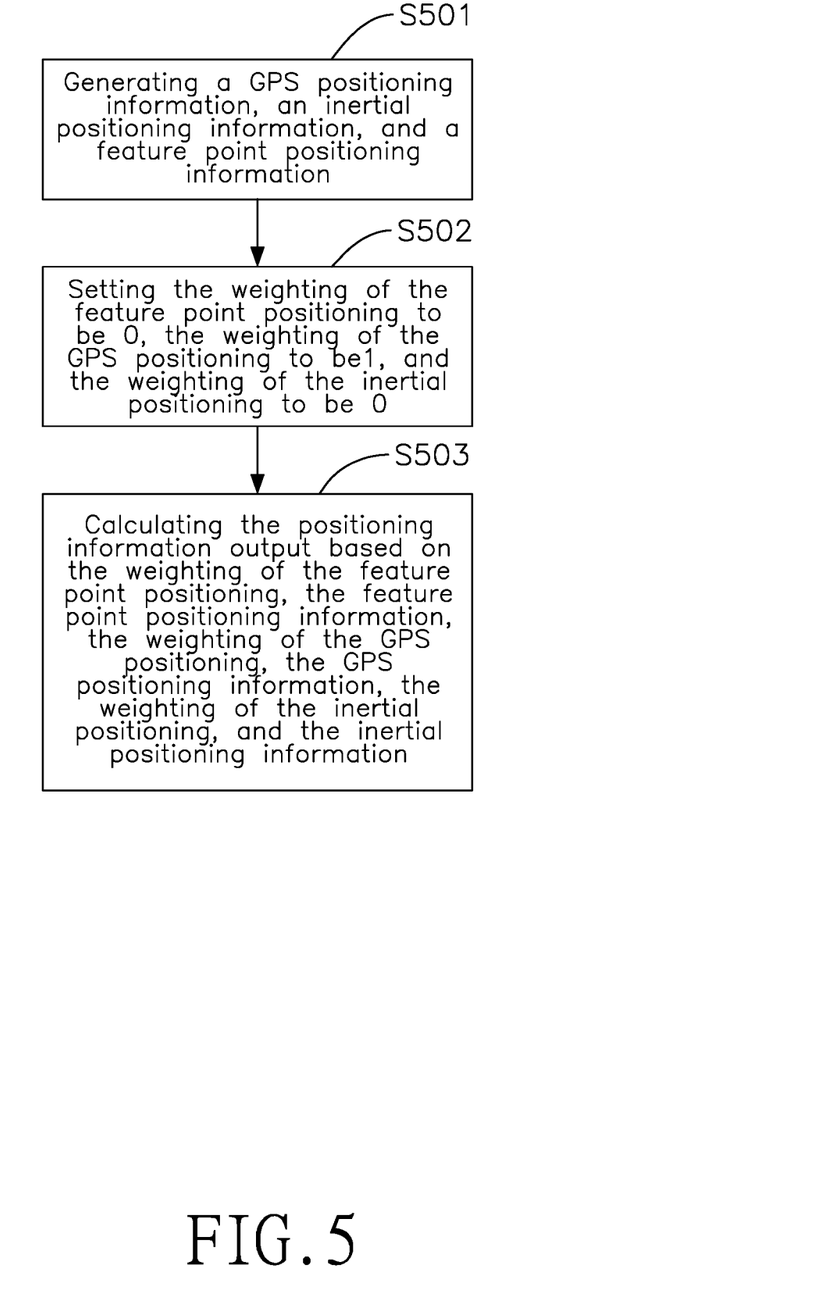
FIG. 5 is a flow chart schematic of the initialization procedure for the first preferred embodiment of the present invention.

Referring to FIG. 5, the initialization procedure includes the following steps:

generating a GPS positioning information, an inertial positioning information, and a feature point positioning information (S501);

setting the weighting of the feature point positioning to be 0, the weighting of the GPS positioning to be 1, and the weighting of the inertial positioning to be 0 (S502);

calculating the positioning information output based on the weighting of the feature point positioning, the feature point positioning information, the weighting of the GPS positioning, the GPS positioning information, the weighting of the inertial positioning, and the inertial positioning information (S503).

Through the initialization procedure, at the beginning, before any feature point has been detected, the GPS positioning information is used as the default, and the GPS positioning information is used as the information output to allow the user to confirm the current approximate location. Then, start to detect a first feature point to more accurately locate the user's position.

Furthermore, the positioning information output is calculated according to the following formula:

$$P_{out}=W_{GPS}\times P_{GPS}+W_{IMU}\times P_{IMU}+W_{feature}\times P_{feature}$$

Wherein, $W_{GPS}+W_{IMU}+W_{feature}=1$ $P_{out}$ is the positioning information output; $W_{GPS}$ is the weighting of the GPS positioning; $P_{GPS}$ is the first GPS positioning information, the second positioning information of the first GPS, or the second GPS positioning information; $W_{IMU}$ is the weighting of the inertial positioning; $P_{IMU}$ is the first inertial positioning information, the second positioning information of the first inertial, or the second inertial positioning information; $W_{feature}$ is the weighting of the feature point positioning; $P_{feature}$ is the first feature point positioning information, the second positioning information of the first feature point, or the second feature point positioning information.

The weighting of the GPS positioning is calculated based on the following formula:

$$W_{GPS}=C_{GPS}+\alpha_{IMU}\times t$$

wherein, the $C_{GPS}$ is the GPS drift error parameter; $\alpha_{IMU}$ is the inertial cumulative error parameter; t is the cumulative time from the time point of detecting the second feature point.

The weighting of the inertial positioning is calculated based on the following formula:

$$W_{IMU}=1-C_{GPS}-\alpha_{IMU}\times t$$

wherein, the $C_{GPS}$ is the GPS drift error parameter; $\alpha_{IMU}$ is the inertial cumulative error parameter; t is the cumulative time from the time point of detecting the second feature point.

The method of adaptive weighting adjustment positioning of the present invention is implemented by an adaptive weighting adjustment positioning system. Generally, the adaptive weighting adjustment positioning system is disposed on a vehicle for locating the vehicle, and is further integrated with a navigation system to provide a driving navigation function.

Figure 6:
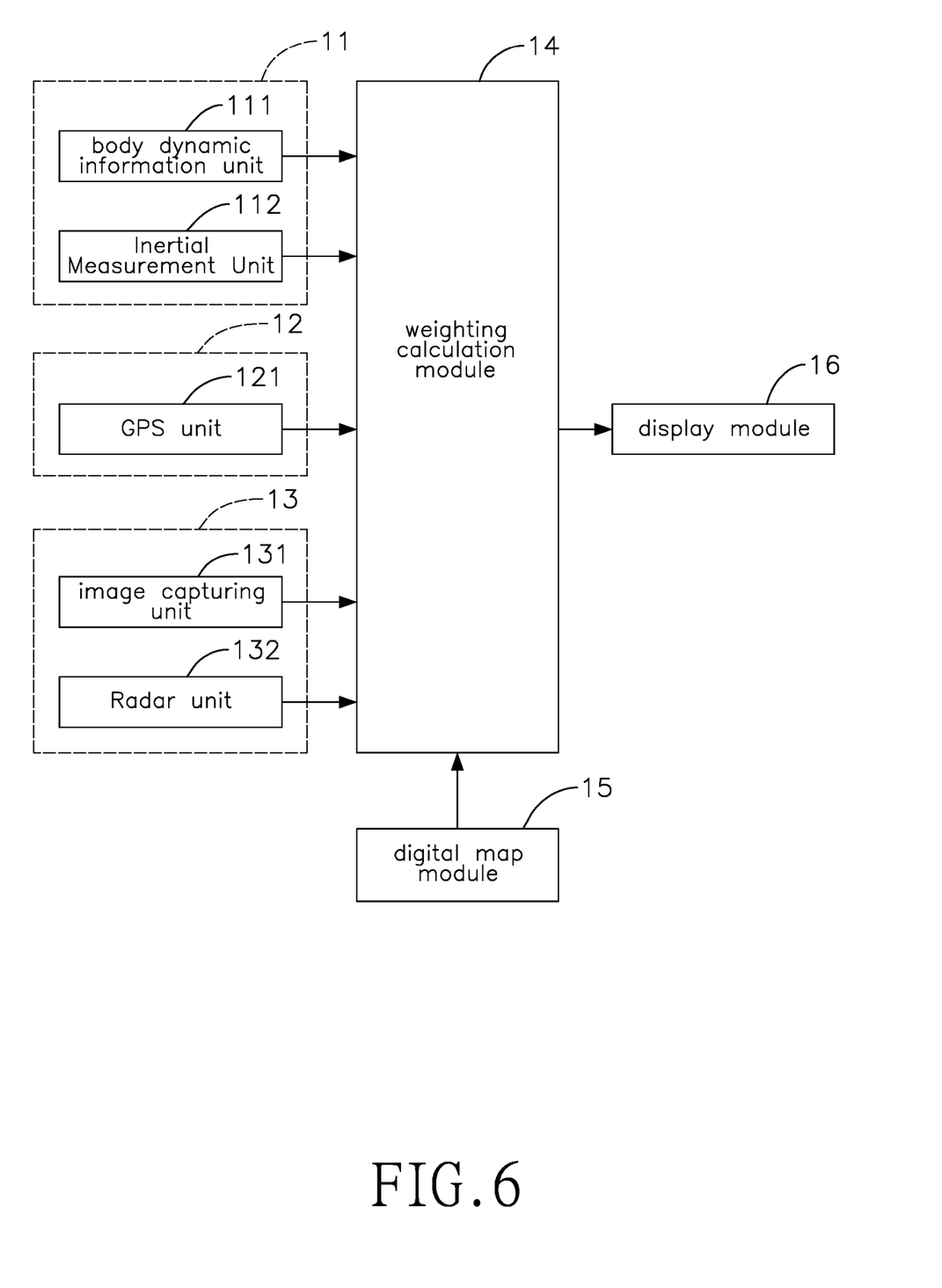
FIG. 6 is a system block diagram of a preferred embodiment of the present invention.

Referring to FIG. 6, the adaptive weighting adjustment positioning system includes an inertial positioning module 11, a GPS positioning module 12, a feature point positioning module 13, a weighting calculation module 14, a digital map module 15 and a display module 16.

The inertial positioning module 11 includes a dynamic body information unit 111 and an inertia measurement unit 112, each electrically connected to the weighting calculation module 14. The dynamic body information unit 111 and the inertial measurement unit 112 detect the moving direction and the velocity of the vehicle to generate and transmit the first inertial positioning information, and the second positioning information of the first inertial, or the second inertial positioning information to the weighting calculation module 14 that reflects the position of the vehicle.

The GPS positioning module 12 includes a GPS positioning unit 121 to generate the first GPS positioning information, the second positioning information of the first GPS or the second GPS positioning information reflecting the position of the vehicle and electrically connected to the weighting calculation module 14, so as to transmit the first GPS positioning information, the second positioning information of the first GPS, or the second GPS positioning information to the weighting calculation module 14.

The feature point positioning module 13 includes an image capturing unit 131 and a radar unit 132, each electrically connected to the weighting calculation module 14. The image capturing unit 131 and the radar unit 132 detect the first feature point or the second feature point and generate resultant detection information to transmit to the weighting calculation module 14 at the moment when the first feature point or the second feature point is detected. In the preferred embodiment, the radar unit 132 could be a Lidar (Light Detection and Ranging).

The weighting calculation module 14 is electrically connected to the digital map module 15 and the display module 16 and is configured to compare between the received resultant detection information and a digital map in the digital map module 15 so as to generate the first feature point positioning information, the second positioning information of the first feature point, or the second feature point positioning information, that is, the weighting calculation module 14 determines the current position of the user according to the comparison results. For example, the feature point positioning module 13 captures the image information through the image capturing unit 131, and detects nearby surface feature information through the radar unit 132, and transmits the information to the weighting calculation module 14. The digital map module 15 stores the digital map data of each place, and the map data has comparison data of landmarks or characteristic signs for various places as well as the feature comparison data of the surface features and the detailed position coordinate data thereof for various places. And according to the current information provided by the feature point positioning module 13 and the comparison data of the landmarks or the signs or the surface features in those digital map data for various places, the weighting calculation module 14 determines whether the current information provided by the feature point positioning module 13 matches with whichever comparison data of the landmarks or the signs or the surface features, so that the corresponding detailed coordinate position information can be generated according to the matched comparison data of the landmarks or the signs or the surface features, so as to provide positioning functions.

In addition, the weighting calculation module 14 is further configured to receive information transmitted by the inertial positioning module 11, the GPS positioning module 12 and the feature point positioning module 13 and set the feature point positioning weighting, the GPS positioning weighting, the inertial positioning weighting according to the information, and calculating and generating the output positioning information, and transmitting the output positioning information to the display module 16, and the display module 16 displays the current position for user references.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method of adaptive weighting adjustment positioning, including the following steps:

performing an initialization procedure;
determining whether a first feature point is detected, wherein an optical image of the first feature point is captured to determine whether the first feature point matches with a surface feature object whose surface features are described in a map data which also provides coordinate position information for the surface feature object;
when the first feature point is detected,
generating a first feature point positioning information, a first GPS positioning information and a first inertial positioning information;
setting a weighting of a feature point positioning to be larger than the sum of a weighting of a GPS positioning and a weighting of an inertial positioning; and
calculating a positioning information output based on the weighting of the feature point positioning, the first feature point positioning information, the weighting of the GPS positioning, the first GPS positioning information, the weighting of the inertial positioning, and the first inertial positioning information; wherein, the sum of the weighting of the feature point positioning, the weighting of the GPS positioning, and the weighting of the inertial positioning is equal to 1; wherein, the first feature point positioning information, the first GPS positioning information, and the first inertial positioning information each reflect a respective location in a positioning coordinate system;
when the first feature point is not detected,
setting the weighting of the feature point positioning to be smaller than the sum of the weighting of the GPS positioning and the weighting of the inertial positioning; and
calculating a positioning information output based on the weighting of the feature point positioning, the first feature point positioning information, the weighting of the GPS positioning, the first GPS positioning information, the weighting of the inertial positioning, and the first inertial positioning information;
after a first time point, determining whether the first feature point is still detected;
when the first feature point is detected again, generating a second positioning information of the first feature point, a second positioning information of the first GPS, and a second positioning information of the first inertial;
determining whether a second feature point is detected or not; wherein the first feature point and the second feature point are two continuously detected feature points;
when the second feature point is detected, generating a second feature point positioning information, a second GPS positioning information, and a second inertial positioning information;
wherein, the positioning information output is calculated based on the following formula:

$$P_{out} = W_{GPS} \times P_{GPS} + W_{IMU} \times P_{IMU} + W_{feature} \times P_{feature}$$

wherein, $W_{GPS} + W_{IMU} + W_{feature} = 1$
$P_{out}$ is the positioning information output; $W_{GPS}$ is the weighting of the GPS positioning; $P_{GPS}$ is the first GPS positioning information, the second positioning information of the first GPS, or the second GPS positioning information; $W_{IMU}$ is the weighting of the inertial positioning; $P_{IMU}$ is the first inertial positioning information, the second positioning information of the first inertial, or the second inertial positioning information; $W_{feature}$ is the weighting of the feature point positioning; $P_{feature}$ is the first feature point positioning information, the second positioning information of the first feature point, or the second feature point positioning information;
wherein, the weighting of the GPS positioning is calculated based on the following formula:

$$W_{GPS} = C_{GPS} + \alpha_{IMU} \times t$$

wherein, the $C_{GPS}$ is a GPS drift error parameter, $\alpha_{IMU}$ is an inertial cumulative error parameter; t is a cumulative time from a time point of detecting the second feature point.

2. The method as claimed in claim 1, wherein, when the first feature point is detected, the weighting of the feature point positioning is set to be 1 and the weighting of the GPS positioning and the weighting of the inertial positioning are set to be 0;
when the first feature point is not detected, the weighting of the feature point positioning is set to be 0 and the sum of the weighting of the GPS positioning and the weighting of the inertial positioning is set to be 1.

3. The method as claimed in claim 2, wherein, the step of detecting the first feature point and then calculating the positioning information output is further based on the GPS drift error parameter which is generated by the first feature point positioning information and the first GPS positioning information.

4. The method as claimed in claim 2, wherein, the step of detecting the first feature point and then calculating the positioning information output is further followed by the following steps, including:
setting the weighting of the feature point positioning to be 1 and the weighting of the GPS positioning and the weighting of the inertial positioning to be 0;
calculating the positioning information output based on the weighting of the feature point positioning, the second positioning information of the first feature point, the weighting of the GPS positioning, the second positioning information of the first GPS, the weighting of the inertial positioning, and the second positioning information of the first inertial;
generating a first drift value based on the first feature point positioning information and the first GPS positioning information;
generating a second drift value based on the second positioning information of the first feature point and the second positioning information of the GPS;
generating the GPS drift error parameter based on the first drift value and the second drift value.

5. The method as claimed in claim 4, wherein, after generating the GPS drift error parameter, the following steps are further included:
setting the weighting of the feature point positioning to be 1, the weighting of the GPS positioning to be 0 and the weighting of the inertial positioning to be 0;
calculating the positioning information output based on the weighting of the feature point positioning, the second feature point positioning information, the weighting of the GPS positioning, the second GPS positioning information, the weighting of the inertial positioning, and the second inertial positioning information;

generating a first error value based on the first feature point positioning information and the first inertial positioning information;
generating a second error value based on the second feature point positioning information and the second inertial positioning information;
generating the inertial cumulative error parameter based on the first error value and the second error value.

6. The method as claimed in claim 5, wherein, after generating the inertial cumulative error parameter, the following steps are further included:
calculating the weighting of the GPS positioning and the weighting of the inertial positioning based on the GPS drift error parameter and the inertial cumulative error parameter;
setting the weighting of the feature point positioning to be 0;
calculating the positioning information output based on the weighting of the feature point positioning, the second feature point positioning information, the weighting of the GPS positioning, the second GPS positioning information, the weighting of the inertial positioning, and the second inertial positioning information.

7. The method as claimed in claim 6, wherein, the GPS drift error parameter and the inertial cumulative parameter are generated based on a look-up table calculation method.

8. The method as claimed in claim 1, wherein, the initialization process includes the following steps:
generating a GPS positioning information, an inertial positioning information, and a feature point positioning information;
setting the weighting of the feature point positioning to be 0, the weighting of the GPS positioning to be 1, and the weighting of the inertial positioning to be 0;
calculating the positioning information output based on the weighting of the feature point positioning, the feature point positioning information, the weighting of the GPS positioning, the GPS positioning information, the weighting of the inertial positioning, and the inertial positioning information.

9. A method of adaptive weighting adjustment positioning, including the following steps:
performing an initialization procedure;
determining whether a first feature point is detected, wherein an optical image of the first feature point is captured to determine whether the first feature point matches with a surface feature object whose surface features are described in a map data which also provides coordinate position information for the surface feature object;
when the first feature point is detected,
generating a first feature point positioning information, a first GPS positioning information and a first inertial positioning information;
setting a weighting of a feature point positioning to be larger than the sum of a weighting of a GPS positioning and a weighting of an inertial positioning; and
calculating a positioning information output based on the weighting of the feature point positioning, the first feature point positioning information, the weighting of the GPS positioning, the first GPS positioning information, the weighting of the inertial positioning, and the first inertial positioning information; wherein the sum of the weighting of the feature point positioning, the weighting of the GPS positioning, and the weighting of the inertial positioning is equal to 1; wherein, the first feature point positioning information, the first GPS positioning information, and the first inertial positioning information each reflect a respective location in a positioning coordinate system;
when the first feature point is not detected,
setting the weighting of the feature point positioning to be smaller than the sum of the weighting of the GPS positioning and the weighting of the inertial positioning; and
calculating a positioning information output based on the weighting of the feature point positioning, the first feature point positioning information, the weighting of the GPS positioning, the first GPS positioning information, the weighting of the inertial positioning, and the first inertial positioning information;
after a first time point, determining whether the first feature point is still detected;
when the first feature point is detected again, generating a second positioning information of the first feature point, a second positioning information of the first GPS, and a second positioning information of the first inertial;
determining whether a second feature point is detected or not; wherein the first feature point and the second feature point are two continuously detected feature points;
when the second feature point is detected, generating a second feature point positioning information, a second GPS positioning information, and a second inertial positioning information;
wherein, the positioning information output is calculated based on the following formula:

$$P_{out}=W_{GPS} \times P_{GPS}+W_{IMU} \times P_{IMU}+W_{feature} \times P_{feature}$$

wherein $W_{GPS}+W_{IMU}+W_{feature}=1$
$P_{out}$ is the positioning information output; $W_{GPS}$ is the weighting of the GPS positioning; $P_{GPS}$ is the first GPS positioning information, the second positioning information of the first GPS, or the second GPS positioning information; $W_{IMU}$ is the weighting of the inertial positioning; $P_{IMU}$ is the first inertial positioning information, the second positioning information of the first inertial, or the second inertial positioning information; $W_{feature}$ is the weighting of the feature point positioning; $P_{feature}$ is the first feature point positioning information, the second positioning information of the first feature point, or the second feature point positioning information;
wherein, the weighting of the inertial positioning is calculated based on the following formula:

$$W_{IMU}=1-C_{GPS}-\alpha_{IMU} \times t$$

wherein, the $C_{GPS}$ is a GPS drift error parameter; $\alpha_{IMU}$ is an inertial cumulative error parameter; t is a cumulative time from a time point of detecting the second feature point.

10. The method as claimed in claim 9, wherein, when the first feature point is detected, the weighting of the feature point positioning is set to be 1 and the weighting of the GPS positioning and the weighting of the inertial positioning are set to be 0;
when the first feature point is not detected, the weighting of the feature point positioning is set to be 0 and the sum of the weighting of the GPS positioning and the weighting of the inertial positioning is set to be 1.

11. The method as claimed in claim 10, wherein, the step of detecting the first feature point and then calculating the positioning information output is further based on the GPS drift error parameter which is generated by the first feature point positioning information and the first GPS positioning information.

12. The method as claimed in claim 10, wherein, the step of detecting the first feature point and then calculating the positioning information output is further followed by the following steps, including:
 setting the weighting of the feature point positioning to be 1 and the weighting of the GPS positioning and the weighting of the inertial positioning to be 0;
 calculating the positioning information output based on the weighting of the feature point positioning, the second positioning information of the first feature point, the weighting of the GPS positioning, the second positioning information of the first GPS, the weighting of the inertial positioning, and the second positioning information of the first inertial;
 generating a first drift value based on the first feature point positioning information and the first GPS positioning information;
 generating a second drift value based on the second positioning information of the first feature point and the second positioning information of the GPS;
 generating the GPS drift error parameter based on the first drift value and the second drift value.

13. The method as claimed in claim 12, wherein, after generating the GPS drift error parameter, the following steps are further included:
 setting the weighting of the feature point positioning to be 1, the weighting of the GPS positioning to be 0 and the weighting of the inertial positioning to be 0;
 calculating the positioning information output based on the weighting of the feature point positioning, the second feature point positioning information, the weighting of the GPS positioning, the second GPS positioning information, the weighting of the inertial positioning, and the second inertial positioning information;
 generating a first error value based on the first feature point positioning information and the first inertial positioning information;
 generating a second error value based on the second feature point positioning information and the second inertial positioning information;
 generating the inertial cumulative error parameter based on the first error value and the second error value.

14. The method as claimed in claim 13, wherein, after generating the inertial cumulative error parameter, the following steps are further included:
 calculating the weighting of the GPS positioning and the weighting of the inertial positioning based on the GPS drift error parameter and the inertial cumulative error parameter;
 setting the weighting of the feature point positioning to be 0;
 calculating the positioning information output based on the weighting of the feature point positioning, the second feature point positioning information, the weighting of the GPS positioning, the second GPS positioning information, the weighting of the inertial positioning, and the second inertial positioning information.

15. The method as claimed in claim 14, wherein, the GPS drift error parameter and the inertial cumulative parameter are generated based on a look-up table calculation method.

16. The method as claimed in claim 9, wherein, the initialization process includes the following steps:
 generating a GPS positioning information, an inertial positioning information, and a feature point positioning information;
 setting the weighting of the feature point positioning to be 0, the weighting of the GPS positioning to be 1, and the weighting of the inertial positioning to be 0;
 calculating the positioning information output based on the weighting of the feature point positioning, the feature point positioning information, the weighting of the GPS positioning, the GPS positioning information, the weighting of the inertial positioning, and the inertial positioning information.

* * * * *